US009007180B2

(12) United States Patent
Lee et al.

(10) Patent No.: US 9,007,180 B2
(45) Date of Patent: Apr. 14, 2015

(54) ANTI-COLLISION SYSTEM AND METHOD FOR REDUCING THE COLLISION OF DATA TRANSMITTED BY RFID TAGS

(71) Applicant: Research & Business Foundation Sungkyunkwan University, Suwon-si (KR)

(72) Inventors: Tae Jin Lee, Suwon-si (KR); Jongho Park, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 205 days.

(21) Appl. No.: 13/653,526

(22) Filed: Oct. 17, 2012

(65) Prior Publication Data
US 2013/0093571 A1    Apr. 18, 2013

(30) Foreign Application Priority Data
Oct. 18, 2011    (KR) .......................... 10-2011-0106399

(51) Int. Cl.
*H04Q 5/22*    (2006.01)
*G06K 7/10*    (2006.01)

(52) U.S. Cl.
CPC ................................. *G06K 7/10049* (2013.01)

(58) Field of Classification Search
USPC ............ 340/10.2, 572.1, 10.1, 3.41; 370/346, 370/445, 277, 278, 280–282, 310–314
See application file for complete search history.

(56) References Cited

U.S. PATENT DOCUMENTS

| | | | | |
|---|---|---|---|---|
| 5,686,902 A * | 11/1997 | Reis et al. | ..................... | 340/10.2 |
| 7,009,518 B2 * | 3/2006 | Liao et al. | .................. | 340/572.1 |
| 7,228,228 B2 * | 6/2007 | Bartlett et al. | ................ | 701/517 |
| 7,243,855 B2 * | 7/2007 | Matsumoto et al. | .......... | 235/492 |
| 7,253,717 B2 * | 8/2007 | Armstrong et al. | .......... | 340/10.2 |
| 7,312,692 B2 * | 12/2007 | Friedrich | ..................... | 340/10.1 |
| 7,443,877 B2 * | 10/2008 | Cuylen et al. | ................. | 370/458 |
| 7,626,488 B2 * | 12/2009 | Armstrong et al. | .......... | 340/10.2 |
| 7,672,260 B2 * | 3/2010 | Wood, Jr. | ...................... | 370/312 |
| 8,085,131 B2 * | 12/2011 | Park et al. | .................... | 340/10.2 |
| 8,115,602 B2 * | 2/2012 | Eom et al. | .................... | 340/10.2 |
| 8,193,910 B2 * | 6/2012 | Murano | ....................... | 340/10.1 |
| 8,305,194 B2 * | 11/2012 | Noel et al. | ................... | 340/10.2 |
| 8,310,342 B2 * | 11/2012 | Yang et al. | ................... | 340/10.2 |

(Continued)

FOREIGN PATENT DOCUMENTS

KR    10-2008-0058068    6/2008
KR    10-2009-0049346    5/2009

OTHER PUBLICATIONS

Korean Office Action issued Dec. 20, 2012 in counterpart Korean Patent Application No. 10-2011-0106399 (4 pages, in Korean).

*Primary Examiner* — Daniell L Negron
*Assistant Examiner* — Son M Tang
(74) *Attorney, Agent, or Firm* — NSIP Law

(57) ABSTRACT

Provided are an anti-collision system and method which address the mobility of radio frequency identification (RFID) tags. An RFID reader may transmit an identification start command to identify a plurality of RFID tags in an identification area of the RFID reader. The RFID tags compare the number of collisions of each RFID tag receiving the identification start command with a collision threshold $C_{th}$ and attempt to be identified in a binary tree section of a frame or in a framed slotted ALOHA (FSA) section of the frame based on the comparison.

23 Claims, 5 Drawing Sheets

(56) References Cited

U.S. PATENT DOCUMENTS

| | | | |
|---|---|---|---|
| 8,310,343 B2* | 11/2012 | Zhou et al. | 340/10.2 |
| 8,362,879 B2* | 1/2013 | Bae et al. | 340/10.2 |
| 8,477,016 B2* | 7/2013 | Seo et al. | 340/10.2 |
| 8,525,645 B2* | 9/2013 | Lim et al. | 340/10.1 |
| 8,610,544 B2* | 12/2013 | Jang et al. | 340/10.2 |
| 8,773,242 B2* | 7/2014 | Park et al. | 340/10.2 |
| 2006/0044114 A1* | 3/2006 | Friedrich et al. | 340/10.2 |
| 2007/0085661 A1* | 4/2007 | Yamazoe et al. | 340/10.1 |
| 2008/0122581 A1* | 5/2008 | Bae et al. | 340/10.2 |
| 2008/0150674 A1* | 6/2008 | Park et al. | 340/3.41 |
| 2009/0179738 A1* | 7/2009 | Kageyama | 340/10.1 |
| 2009/0267747 A1* | 10/2009 | Rivest et al. | 340/10.51 |
| 2010/0001843 A1* | 1/2010 | Bae et al. | 340/10.2 |
| 2010/0026462 A1* | 2/2010 | Lim et al. | 340/10.1 |
| 2012/0092136 A1* | 4/2012 | Zhang et al. | 340/10.2 |

* cited by examiner

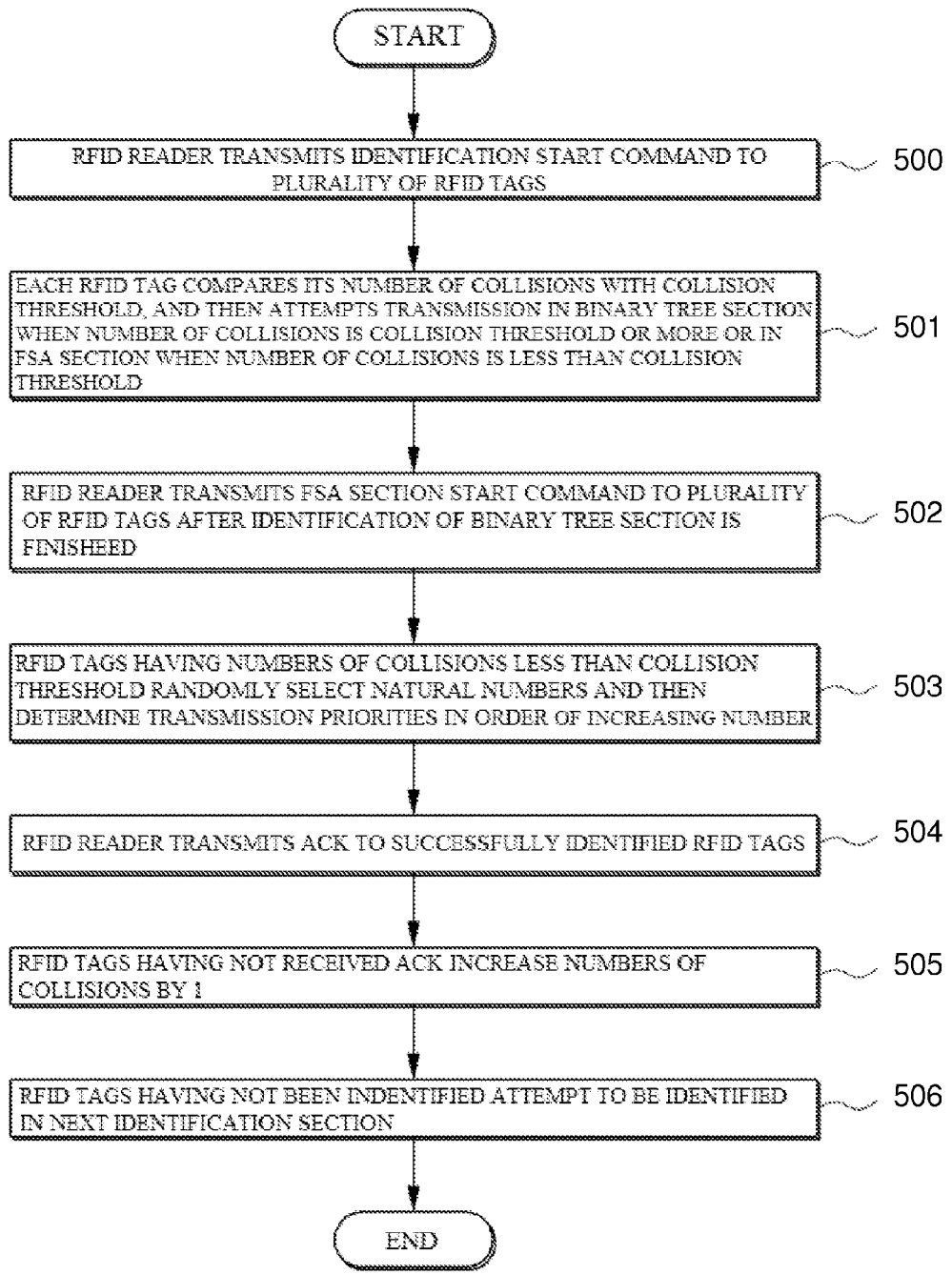

ANTI-COLLISION SYSTEM AND METHOD FOR REDUCING THE COLLISION OF DATA TRANSMITTED BY RFID TAGS

CROSS-REFERENCE TO RELATED APPLICATION(S)

This application claims the benefit under 35 USC §119(a) of Korean Patent Application No. 10-2011-0106399, filed on Oct. 18, 2011, in the Korean Intellectual Property Office, the entire disclosure of which is incorporated herein by reference for all purposes.

BACKGROUND

1. Field

The following description relates to an anti-collision system and method which reduce the collision of data transmitted by radio frequency identification (RFID) tags.

2. Discussion of Related Art

Similar to a bar code, a magnetic card, and the like, an RFID system may be used for automatic identification, and may be applied to many fields such as individual identification, product identification, location tracing, and financial services. A field that is currently drawing a lot of attention is physical distribution management, and the like, in which RFID systems are being used to replace existing bar code systems.

An RFID system may simultaneously identify a plurality of RFID tags that are present in a predetermined area. While an existing bar code system requires a line of sight (LOS) between a scanner and an object to be identified, the RFID system may identify an RFID tag without a LOS using a radio wave. Also, it is possible to identify a moving RFID tag in the predetermined area, which allows for a faster identification speed than existing identification systems.

In an RFID system, when an RFID reader attempts to identify an RFID tag in an RF area, and a plurality of RFID tags present in the RF area simultaneously transmit their identification information (identities (IDs)) to the RFID reader, the identification information may collide with each other which may prevent the RFID tags from being properly identified.

To prevent a collision of information, an RFID system may use anti-collision technology. Thus far, research has been conducted on anti-collision technology for a static situation in which an RFID tag does not move. However, an RFID system that continuously traces product movement, for example, on a conveyor belt system, and the like, must identify an RFID tag during a short time in which the RFID tag passes through the area of an RFID reader. In this example, the RFID reader fails in identification unless the RFID tag is identified in the predetermined time.

RFID anti-collision mechanisms are generally classified into framed slotted ALOHA (FSA)-based mechanisms and binary tree-based mechanisms. In a dynamic FSA (DFSA) mechanism, the number of RFID tags must be estimated to select an optimum frame size. However, when RFID tags move dynamically, it is difficult to accurately estimate the number of RFID tags.

Also, in the existing DFSA mechanism, there is no priority between an RFID tag that has undergone many collisions and an RFID tag that has not undergone many collisions. Thus, there is a high probability that an RFID tag in the identification area of an RFID reader that has undergone many collisions will compete with RFID tags that are new to the identification area. Accordingly, an RFID tag may fail to be identified, and may move out of the identification area due to its movement.

In an existing binary tree mechanism, once identification begins, RFID tags that newly flow in the identification area of an RFID reader cannot be identified until all RFID tags present in the identification area at the start of identification are identified. Because it is not possible to adjust the time to attempt identification and the number of times to attempt identification, the existing binary tree mechanism is not appropriate for a situation in which RFID tags dynamically move.

SUMMARY

In an aspect, there is provided a method for reducing the collision of data transmitted by radio frequency identification (RFID) tags, the method including transmitting, by an RFID reader, an identification start command which identifies one or more RFID tags in an identification area of the RFID reader, and comparing, at an RFID tag, a number of collisions of the respective RFID tag with a collision threshold ($C_{th}$), and adding an identification of the RFID tag in a binary tree section of a frame or in a framed slotted ALOHA (FSA) section of the frame based on the comparison.

In response to the RFID tag having a number of collisions equal to or more than $C_{th}$, the adding may comprise adding the identification of RFID tag to the binary tree section of the frame.

In response to the RFID tag having a number of collisions less than $C_{th}$, the adding may comprise adding the identification of the RFID tag to the FSA section of the frame after the binary tree section of the frame ends.

The method may further comprise transmitting, by the RFID reader, an FSA section start command in response to identification of the binary tree section being finished, and randomly selecting, by the RFID tag, natural numbers in a range from 0 to L−1 and that have decreasing transmission priorities in order of increasing value, as time slots of the FSA section of the frame with which to insert the identification of the RFID tag.

The method may further comprise transmitting, from the RFID reader, an acknowledgement (ACK) indicating that the RFID reader successfully identified the RFID tag.

In response to the RFID tag not receiving an ACK during a predetermined time period, the RFID tag may increase a number of collisions of the RFID tag by 1.

In an aspect, there is provided an anti-collision system using radio frequency identification (RFID), the anti-collision system including an RFID reader comprising an RF transceiver configured to perform transmission/reception with a plurality of RFID tags using an RF method, and an identification module configured to transmit an identification start command to identify one or more RFID tags that are present in an identification area of the RFID reader, and an RFID tag configured to compare a number of collisions of the RFID tag with a collision threshold ($C_{th}$), and to add an identification of the RFID tag in a binary tree section of a frame or in a framed slotted ALOHA (FSA) section of the frame based on the comparison.

In response to the RFID tag having a number of collisions less than $C_{th}$, the RFID tag may add the identification of the RFID tag in the FSA section of the frame after the binary tree section ends.

The identification module may transmit an FSA section start command to the RFID tag, in response to the identification of the binary tree section being finished.

The RFID tag may randomly select natural numbers in a range from 0 to L−1 and which have decreasing transmission priorities in order of increasing value, as time slots of the FSA section of the frame with which to insert the identification of the RFID tag.

The identification module may transmit an acknowledgment (ACK) to the RFID tag indicating that the RFID reader successfully identified the RFID tag.

The anti-collision system may further comprise, in response to the RFID tag not receiving an acknowledgment (ACK) within a predetermined time period, the RFID tag may increase a number of collisions of the RFID tag by 1.

The RFID tag may add the identification of the RFID tag in a next identification section of the frame.

The RFID reader may further comprise a frame determination module configured to determine a frame size L of the FSA section.

The frame determination module may calculate a number $n_{new}$ of new RFID tags flowing in the identification area of the RFID reader using $n_{new}=T_{iden} \cdot V_{tag} \cdot D_{tag}$, where $V_{tag}$ is a movement speed of the inflow RFID tags, and $D_{tag}$ is a linear density of the inflow RFID tags.

The frame determination module may calculate a number $n(i)$ of RFID tags having undergone collisions i times using $n(i)=(P_c)^i \cdot n_{new}$, where $P_c$ is a probability of collision in the FSA section.

When a number of RFID tags to be identified in the binary tree section is set to $n(C_{th})$, the frame determination module may calculate the frame size L of the FSA section using $$L = \sum_{i=0}^{C_{th}-1} n(i).$$

A time $T_{bin}$ for the binary tree section and a time $T_{FSA}$ for the FSA section may satisfy $T_{iden} \geq T_{bin}+T_{FSA}$ where $T_{iden}$ is a total identification period.

The frame determination module may calculate the $T_{bin}$ for the binary tree section using $T_{bin}=2.9 \cdot n(C_{th}) \cdot T_{slot}$, where 2.9 is an average number of slots used for identifying one RFID tag using a binary tree.

The frame determination module may calculate the $T_{FSA}$ for the FSA section using $T_{FSA}=L \cdot T_{slot}$.

In response to the RFID tag having a number of collisions greater than or equal to $C_{th}$, the adding may comprise adding the identification of RFID tag to the binary tree section of the frame.

Other features and aspects may be apparent from the following detailed description, the drawings, and the claims.

BRIEF DESCRIPTION OF THE DRAWINGS

FIG. 5 is a flowchart illustrating an example of an anti-collision method based on the mobility of RFID tags.

Figure 1:
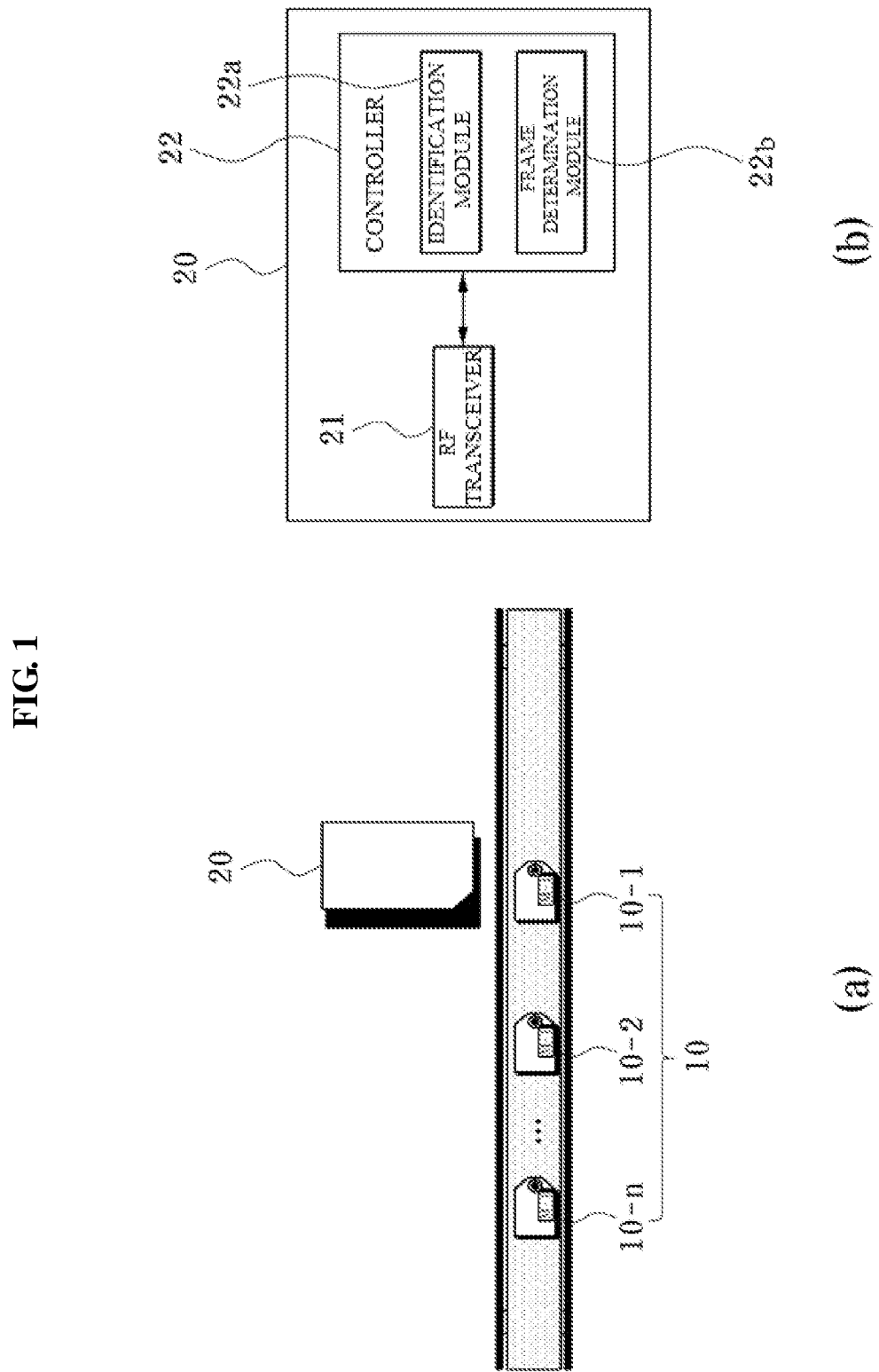
FIG. 1 is a diagram illustrating an example of an anti-collision system based on the mobility of radio frequency identification (RFID) tags.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 2:
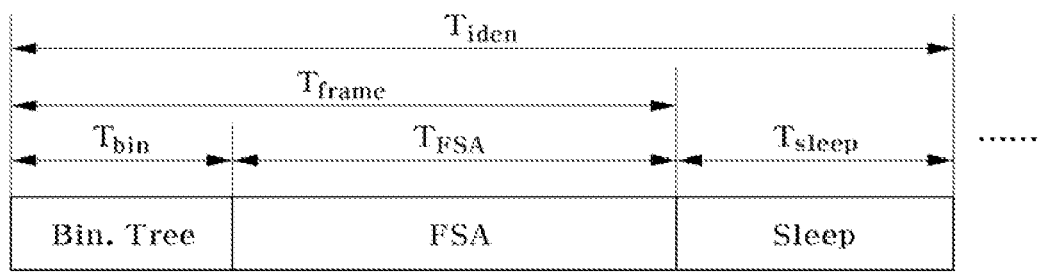
FIG. 2 is a diagram illustrating an example of a frame used in an anti-collision system based on the mobility of RFID tags.

FIG. 1 illustrates an example of an anti-collision system based on the mobility of radio frequency identification (RFID) tags. FIG. 2 illustrates an example of a frame that may be used in an anti-collision system based on the mobility of RFID tags.

Referring to FIG. 1 and FIG. 2, the anti-collision system includes a plurality of RFID tags 10 (10-1 to 10-n (where n is a natural number)) and an RFID reader 20. The RFID reader 20 includes an RF transceiver 21, and a controller 22 which includes an identification module 22a and a frame determination module 22b. In the example of FIG. 1, the RFID reader 20 identifies the RFID tags 10 while the plurality of RFID tags 10 move along a conveyor belt. In this example, the RFID reader 20 may know the average movement speed of the RFID tags 10 (e.g., predetermined speed on a conveyor belt) and the density of the RFID tags 10. Movement speed and density of the RFID tags 10 are characteristics of an RFID application system, and may be calculated after the RFID reader 20 measures the amount of inflow of RFID tags 10, or may be directly input to the RFID reader 20, for example, by an administrator of the RFID application system. In addition, the respective RFID tags 10 (10-1 to 10-n) may store their respective collisions in memories M (M-1 to M-n) while identification occurs, that is, while power is supplied from the RFID reader 20.

According to various aspects, an identification section used in an anti-collision system may include a binary tree identification section and a framed slotted ALOHA (FSA) identification section as shown in FIG. 2.

In FIG. 2, $T_{frame}$ is the length of a frame that may be obtained by summing the binary tree identification section and the FSA section, $T_{bin}$ is the length of the binary tree identification section, and $T_{FSA}$ is the length of the FSA section. In various examples, the identification module 22a of the RFID reader 20 may attempt identification at intervals of $T_{iden}$. In this example, the length of time in which the identification module 22a is in a sleep state without performing an identification operation is defined as $T_{sleep}$.

In order to identify RFID tags 10 present in an identification area, the identification module 22a may control the RF transceiver 21 to transmit an identification start command.

An RFID tag 10 may receive the identification start command of the identification module 22a and compare its number of collisions with a collision threshold $C_{th}$, and may attempt transmission to the RFID reader 20 in the binary tree section when the number of collisions is at or above the collision threshold $C_{th}$. As another example, an RFID tag 10 of which the number of collisions is less than the collision threshold $C_{th}$ may attempt to be identified by the RFID reader 20 in the FSA section after the binary tree section ends.

When identification of the binary tree section is finished, the identification module 22a may transmit an FSA section start command. For example, RFID tags 10 which receive the FSA section start command and which have a numbers of collisions that is less than the collision threshold $C_{th}$, may randomly select natural numbers in a range from 0 to L−1 by exchanging RF signals with the identification module 22a, and may select the corresponding slots in the FSA section such as in order of increasing number, thereby determining a transmission sequence. Here, RFID tags 10 that select slots that do not overlap with slots of other RFID tags 10 present in the identification area should be successfully identified. On the other hand, RFID tags 10 selecting slots that overlap with the slots of the other RFID tags 10 may not be identified by the RFID reader 20 because collisions may occur. Meanwhile, the identification module 22a may transmit an ACK to the successfully identified RFID tags 10 as a response to data transmission of the RFID tags 10. The RFID tags 10 undergoing collisions cannot receive the ACK. These RFID tags 10 may recognize their collisions and may increase their number of collisions by 1.

Before the identification module 22a transmits the FSA section start command to the plurality of RFID tags 10, the frame determination module 22b of the controller 22 may determine the frame size L of the FSA section. For example, an optimum frame size may be equal to the number of RFID tags 10 to be identified. Thus, the frame size L may be adjusted according to the number of the RFID tags 10 to be identified. During an interval of identification attempts of the RFID reader 20, a number $n_{new}$ of RFID tags 10 that flow in the identification area of the RFID reader 20 is as shown in Equation 1 below.

$$n_{new} = T_{iden} \cdot V_{tag} \cdot D_{tag} \qquad \text{[Equation 1]}$$

In Equation 1, $V_{tag}$ is the movement speed of the RFID tags 10, and $D_{tag}$ is the linear density of the RFID tags 10. Thus, the number n(i) of RFID tags 10 that have undergone collisions is as shown in Equation 2 below.

$$n(i) = (P_c)^i \cdot n_{new} \qquad \text{[Equation 2]}$$

Here, $P_c$ is the probability of collision in the FSA section. Thus, the number of RFID tags 10 to be identified in the binary tree section is $n(C_{th})$.

Also, the frame size L is the number of RFID tags 10 to be identified in the FSA section and is as shown in Equation 3 below.

$$L = \sum_{i=0}^{C_{th}-1} n(i) \qquad \text{[Equation 3]}$$

When the frame size is optimal, that is, when the number of RFID tags 10 to be identified equals the frame size, the probability of collision is about 0.24. Thus, by substituting 0.24 for $P_c$, the frame size L in the FSA section may be calculated. Meanwhile, even if the method proposed is employed, when RFID tags 10 exceeding the maximum throughput of the RFID reader 20 flow in, the identification ratio is lowered. Thus, a constraint condition for ensuring an identification ratio is proposed. To ensure an identification ratio, the time used for the binary tree section and the FSA section should be an identification period or less. In other words, Equation 4 below should be satisfied.

$$T_{iden} \geq T_{bin} + T_{FSA} \qquad \text{[Equation 4]}$$

Here, $T_{bin}$ can be calculated as shown in Equation 5 below.

$$T_{bin} = 2.9 \cdot n(C_{th}) \cdot T_{slot} \qquad \text{[Equation 5]}$$

Existing research has analyzed that the average number of slots required for identifying one RFID tag 10 using a binary tree is about 2.9. Here, $T_{slot}$ is the length of one slot. Also, $T_{FSA}$ can be calculated as shown in Equation 6 below.

$$T_{FSA} = L \cdot T_{slot} \qquad \text{[Equation 6]}$$

When the amount $V_{tag} \cdot D_{tag}$ of inflow of the RFID tags 10 is maximized while Equation 4 is satisfied, the throughput of the RFID reader 20 may be maximized while the identification ratio is ensured.

Figure 3:
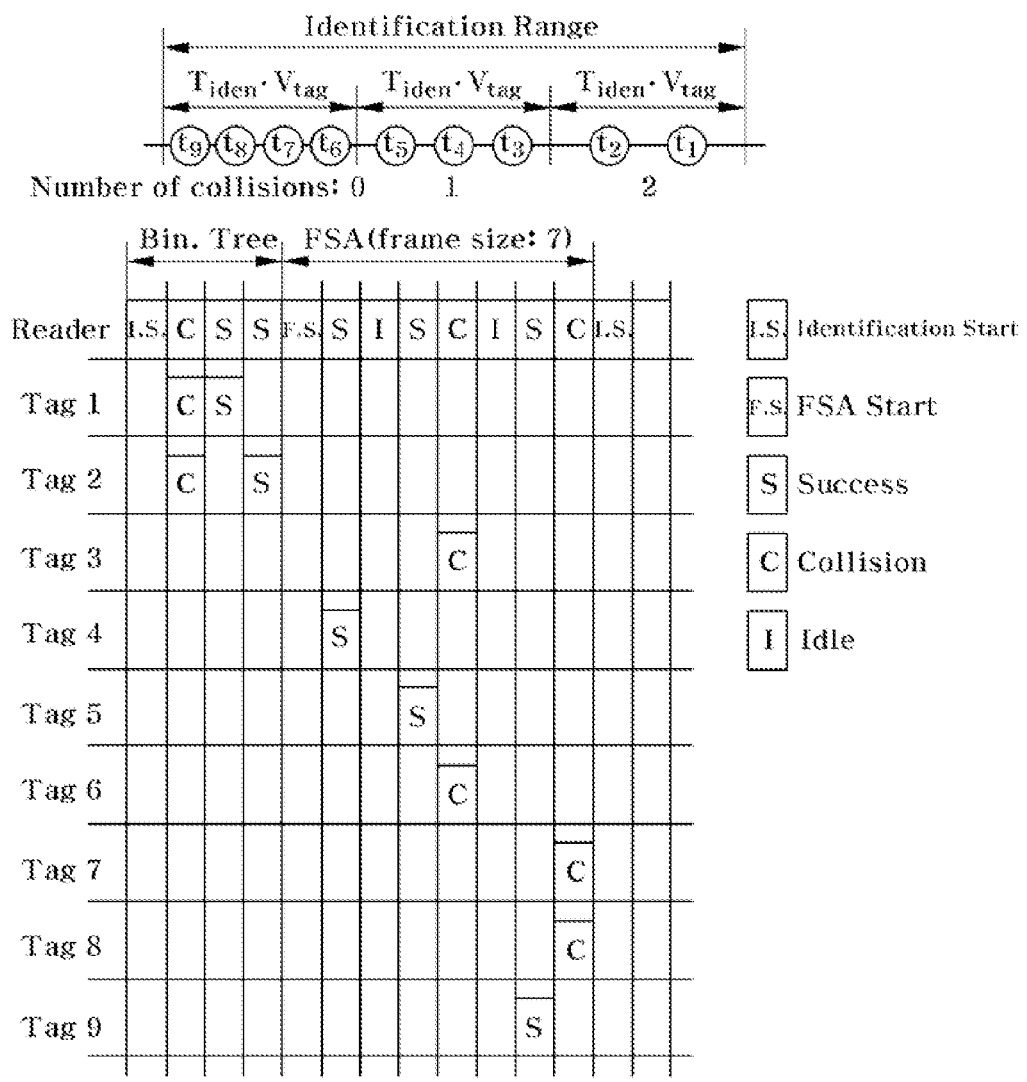
FIG. 3 is a diagram illustrating an example of a process of an anti-collision system.

FIG. 3 illustrates an example of a process of an anti-collision system based on the mobility of RFID tags.

Referring to FIG. 3, the collision threshold $C_{th}$ is 2. In this example, first and second RFID tags 10 that have undergone two collisions already attempt transmission using a binary tree mechanism. Here, the RFID reader 20 consumes a total of three slots to identify the first and second RFID tags 10. After the binary tree section ends, the FSA section starts through an FSA section start command of the RFID reader 20. As shown in the drawing, the frame size of the FSA section is 7. During the FSA section, fourth, fifth and ninth RFID tags 10 are successfully identified by the RFID reader 20. In this example, the remaining RFID tags including third, sixth, seventh and eighth RFID tags 10 are not identified by the RFID reader 20 due to collisions, and attempt to be identified again in the next identification section $T_{iden}$. Among the remaining RFID tags, the number of collisions of the third RFID tag 10 becomes 2. Accordingly, the third RFID tag 10 preferentially attempts to be identified using the binary tree mechanism.

Figure 4:
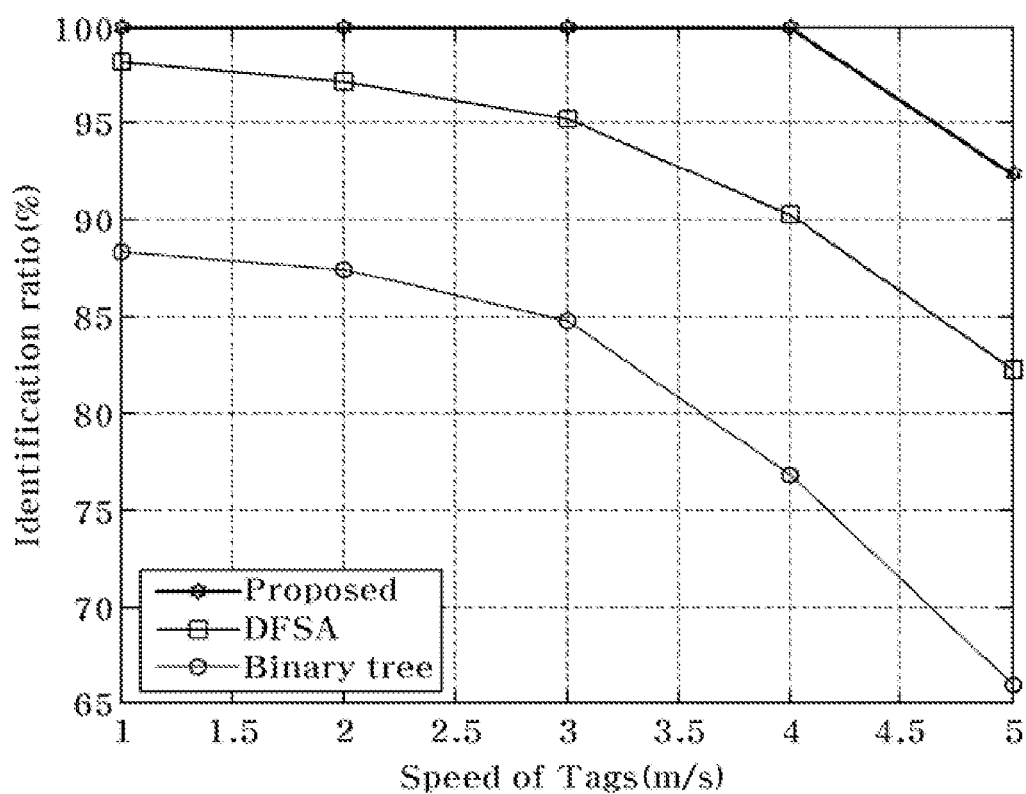
FIG. 4 is a diagram illustrating an example of a comparison between an anti-collision system based on the mobility of RFID tags and an existing system.

FIG. 4 illustrates an example of a comparison between an anti-collision system based on the mobility of RFID tags and an existing system.

Referring to FIG. 4, the performance of the anti-collision system based on the mobility of RFID tags was checked. In this simulation, the radius of the identification area of the RFID reader 20 was set to 10 m, the density $D_{tag}$ of RFID tags 10 was set to 70 tags/m, $C_{th}$ was set to 5, and the length of one slot $T_{slot}$ was set to 4 ms. In addition, the performance of identification ratio was simulated while the speed of the RFID tags 10 was increased in the anti-collision system and respective systems employing dynamic FSA (DFSA) and binary tree mechanisms.

Referring to the simulation results of FIG. 4, in the systems employing the existing DFSA and binary tree mechanisms, there were no identification priorities among the RFID tags 10, and thus, even when the RFID tags 10 moved at low speed, some RFID tags 10 moved out of the identification area of the RFID reader 20 without being identified.

However, in the method described herein according to various aspects, the identification ratio was lowered even though the RFID tags 10 moved at a speed faster than 4 m/s. This was because the amount of inflow of the RFID tags 10 exceeded the maximum throughput of the RFID reader 20. As shown in FIG. 4, the identification ratio of the proposed method was higher than the identification ratio of the existing DFSA and binary tree mechanisms.

FIG. 5 illustrates an example of an anti-collision method based on the mobility of RF tags. Referring to FIG. 1 to FIG. 5, the RFID reader 20 transmits an identification start command to identify RFID tags 10 present in its identification area in 500.

In 501, the RFID tags 10 receiving the identification start command of the RFID reader 20 may compare their numbers of collisions with a collision threshold $C_{th}$, and configure identification attempts in the binary tree section and the FSA section. For example, RFID tags 10 having a number of collisions equal to or greater than $C_{th}$ attempt to be identified in the binary tree section by the RFID reader 20. In addition, RFID tags 10 having a number of collisions less than $C_{th}$ attempt to be identified in the FSA section by the RFID reader 20 after the binary tree section ends.

When identification in the binary tree is finished, the RFID reader 20 transmits an FSA section start command in 502. Accordingly, the RFID tags 10 that have numbers of collisions less than $C_{th}$ and receive the FSA section start command, randomly select natural numbers in a range from 0 to L−1, thereby determining a transmission sequence in the corresponding slots of the FSA section in order of increasing number in 503. For example, RFID tags 10 selecting slots that do not overlap slots of other RFID tags 10 present in the identification area of the RFID reader 20 may be successfully identified, whereas RFID tags 10 selecting slots that overlap the slots of the other RFID tags 10 may not be identified because collisions may occur. In 504, the RFID reader 20 transmits an ACK to the successfully identified RFID tags 10 as a response to data transmission of the RFID tags 10.

Accordingly, the RFID tags 10 that undergo collisions cannot receive the ACK, thereby recognizing their collisions and increasing their number of collisions by 1 in 505. In 506, the RFID tags 10 that have not been identified due to collisions attempt to be identified in the next identification section.

According to various aspects, the anti-collision system may improve an identification ratio in a case in which RFID tags move in an RFID system, thereby improving reliability and maximum throughput of the RFID system. For example, RFID tags may be identified using an FSA mechanism. During this process, the number of transmission attempts made due to collisions between each RFID tag and other RFID tags is recorded, and another identification method is attempted for the corresponding RFID tags when the number of transmission attempts reaches a predetermined threshold or more.

In addition, an RFID tag that is highly likely to fail in identification based on the binary tree mechanism is preferentially identified, such that reliability and maximum throughput of an RFID system can be improved.

Furthermore, the anti-collision system may enable an increase in the maximum movement speed of an RFID tag due to improved reliability of identification of an RFID tag in an RFID system, and also a reduction in cost by reducing the number of RFID readers.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for reducing the collision of data transmitted by radio frequency identification (RFID) tags, the method comprising:
   transmitting, by an RFID reader, an identification start command which identifies one or more RFID tags in an identification area of the RFID reader; and
   comparing, at an RFID tag, a number of collisions of the respective RFID tag with a collision threshold ($C_{th}$), and adding an identification of the RFID tag in a binary tree section of a frame or in a framed slotted (ALOHA (FSA)) section of the frame based on the comparison.

2. The method of claim 1, wherein, in response to the RFID tag having a number of collisions equal to or more than $C_{th}$, the adding comprises adding the identification of RFID tag to the binary tree section of the frame.

3. The method of claim 1, wherein, in response to the RFID tag having a number of collisions less than $C_{th}$, the adding comprises adding the identification of the RFID tag to the FSA section of the frame after the binary tree section of the frame ends.

4. The method of claim 3, further comprising:
   transmitting, by the RFID reader, an FSA section start command in response to identification of the binary tree section being finished; and
   randomly selecting, by the RFID tag, natural numbers in a range from 0 to L-1 and that have decreasing transmission priorities in order of increasing value, as time slots of the FSA section of the frame with which to insert the identification of the RFID tag.

5. The method of claim 4, further comprising transmitting, from the RFID reader, an acknowledgement (ACK) indicating that the RFID reader successfully identified the RFID tag.

6. The method of claim 5, wherein, in response to the RFID tag not receiving an acknowledgement (ACK) during a predetermined time period, the RFID tag increases a number of collisions of the RFID tag by 1.

7. The method of claim 1, wherein the RFID tags recognize their collisions.

8. The method of claim 1, wherein the collision threshold ($C_{th}$) prevents a missing tag that could not be identified by the RFID reader.

9. An anti-collision apparatus using radio frequency identification (RFID), the anti-collision apparatus comprising:
   an RFID reader comprising
      an RF transceiver configured to perform transmission/reception with RFID tags using an RF method; and an identification module configured to transmit an identification start command to identify one or more RFID tags that are present in an identification area of the RFID reader; and an RFID tag configured to compare a number of collisions of the RFID tag with a collision threshold ($C_{th}$), and to add an identification of the RFID tag in a binary tree section of a frame or in a framed slotted (ALOHA (FSA)) section of the frame based on the comparison.

10. The anti-collision apparatus of claim 9, wherein, in response to the RFID tag having a number of collisions less than $C_{th}$, the RFID tag adds the identification of the RFID tag in the FSA section of the frame after the binary tree section ends.

11. The anti-collision apparatus of claim 10, wherein the RFID tag randomly selects natural numbers in a range from 0 to L-1 and which have decreasing transmission priorities in order of increasing value, as time slots of the FSA section of the frame with which to insert the identification of the RFID tag.

12. The anti-collision apparatus of claim 10, wherein the identification module transmits an acknowledgment (ACK) to the RFID tag indicating that the RFID reader successfully identified the RFID tag.

13. The anti-collision apparatus claim 10, further comprising, in response to the RFID tag not receiving an acknowledgment (ACK) within a predetermined time period, the RFID tag increases a number of collisions of the RFID tag by 1.

14. The anti-collision apparatus of claim 13, wherein the RFID tag adds the identification of the RFID tag in a next identification section of the frame.

15. The anti-collision apparatus claim 9, wherein the identification module transmits an FSA section start command to the RFID tag, in response to the identification of the binary tree section being finished.

16. The anti-collision apparatus of claim 9, wherein the RFID reader further comprises a frame determination module configured to determine a frame size L of the FSA section.

17. The anti-collision apparatus of claim 16, wherein the frame determination module calculates a number $n_{new}$, of new RFID tags flowing in the identification area of the RFID reader using $n^{new}=T_{iden} \cdot V_{tag} \cdot D_{tag}$, where $V_{tag}$ is a movement speed of the inflow RFID tags, and $D_{tag}$ is a linear density of the inflow RFID tags.

18. The anti-collision apparatus of claim 16, wherein the frame determination module calculates a number n(i) of RFID tags having undergone collisions i times using $n(i)=(P_c)^i \cdot n_{new}$, where $P_c$ is a probability of collision in the FSA section.

19. The anti-collision apparatus of claim 16, wherein, when a number of RFID tags to be identified in the binary tree section is set to $n(C_{th})$, the frame determination module calculates the frame size L of the FSA section using $$L = \sum_{i=0}^{C_{th}-1} n(i).$$

20. The anti-collision apparatus claim 9, wherein a time $T_{bin}$ for the binary tree section and a time $T_{FSA}$ for the FSA section satisfy $T_{iden} \geq T_{bin}+T_{FSA}$ where $T_{iden}$ is a total identification period.

21. The anti-collision apparatus of claim 20, wherein the frame determination module calculates the $T_{bin}$ for the binary tree section using $T_{bin}=2.9 \cdot n(c_{th}) \cdot T_{slot}$, where 2.9 is an average number of slots used for identifying one RFID tag using a binary tree.

22. The anti-collision apparatus claim 20, wherein the frame determination module calculates the $T_{FSA}$ for the FSA section using $T_{FSA}=L \cdot T_{Slot}$.

23. The anti-collision apparatus of claim 9, wherein, in response to the RFID tag having a number of collisions greater than or equal to $C_{th}$, the adding comprises adding the identification of RFID tag to the binary tree section of the frame.

* * * * *